(12) United States Patent
Wu et al.

(10) Patent No.: US 8,109,022 B2
(45) Date of Patent: Feb. 7, 2012

(54) DEVICE HAVING A STAND WITH EJECTION MECHANISM

(75) Inventors: Wei Wu, Shenzhen (CN); Xin Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 194 days.

(21) Appl. No.: 12/752,061

(22) Filed: Mar. 31, 2010

(65) Prior Publication Data
US 2011/0227468 A1    Sep. 22, 2011

(30) Foreign Application Priority Data

Mar. 16, 2010    (CN) .......................... 2010 1 0125322

(51) Int. Cl.
*A47G 1/16* (2006.01)
(52) U.S. Cl. .......................................... 40/748; 248/469
(58) Field of Classification Search .................... 40/748; 248/454, 469; 206/39.4; 74/47, 45
See application file for complete search history.

(56) References Cited

U.S. PATENT DOCUMENTS

| | | | |
|---|---|---|---|
| 7,950,617 B2 * | 5/2011 | Zhu et al. | 248/469 |
| 2005/0001114 A1 * | 1/2005 | Ogawa | 248/127 |
| 2008/0290240 A1 * | 11/2008 | Stievenard et al. | 248/450 |
| 2011/0007466 A1 * | 1/2011 | Wang | 361/679.2 |

* cited by examiner

*Primary Examiner* — Joanne Silbermann
*Assistant Examiner* — Kristina N Junge
(74) *Attorney, Agent, or Firm* — Altis Law Group, Inc.

(57) ABSTRACT

A device includes a housing defining a first opening, and a casing fixed within the housing defining a second opening opposite to the first opening. The device also includes a sliding member slidably received in the casing, and a stand pivotally connected to the sliding member including an end received in the first opening. A retaining member is slidably connected to the casing to magnetically attract the sliding member to retain the sliding member at a predetermined position. An ejection mechanism is arranged within the casing to be pushed by the retaining member to push the sliding member to move the end out of the first opening.

11 Claims, 10 Drawing Sheets

US 8,109,022 B2

DEVICE HAVING A STAND WITH EJECTION MECHANISM

BACKGROUND

1. Technical Field

The present disclosure relates to a device including a stand with an ejection mechanism.

2. Description of Related Art

Devices such as digital photo frames usually include supports/stands. One common type of stand usually includes a leg that is pivotally hinged about a horizontal axis. When in use, the leg can be angularly displaced between a first position in which it lies generally flush with the rear face of the back cover of the digital photo frame and a second or extended limiting position in which it lies at an angle to the rear face. With the leg in its extended position, the digital photo frame can stand stably on a horizontal surface in an upright or slightly leaning back attitude, being supported in this state by the leg.

Although this type of stand works up to the expectations, a device including a stand with an ejection mechanism is still needed.

BRIEF DESCRIPTION OF THE DRAWINGS

The components in the drawings are not necessarily drawn to scale, the emphasis instead being placed upon clearly illustrating the principles of the device having a stand with an ejection mechanism. Moreover, in the drawings, like reference numerals designate corresponding parts throughout the several views.

DETAILED DESCRIPTION

Figure 1:
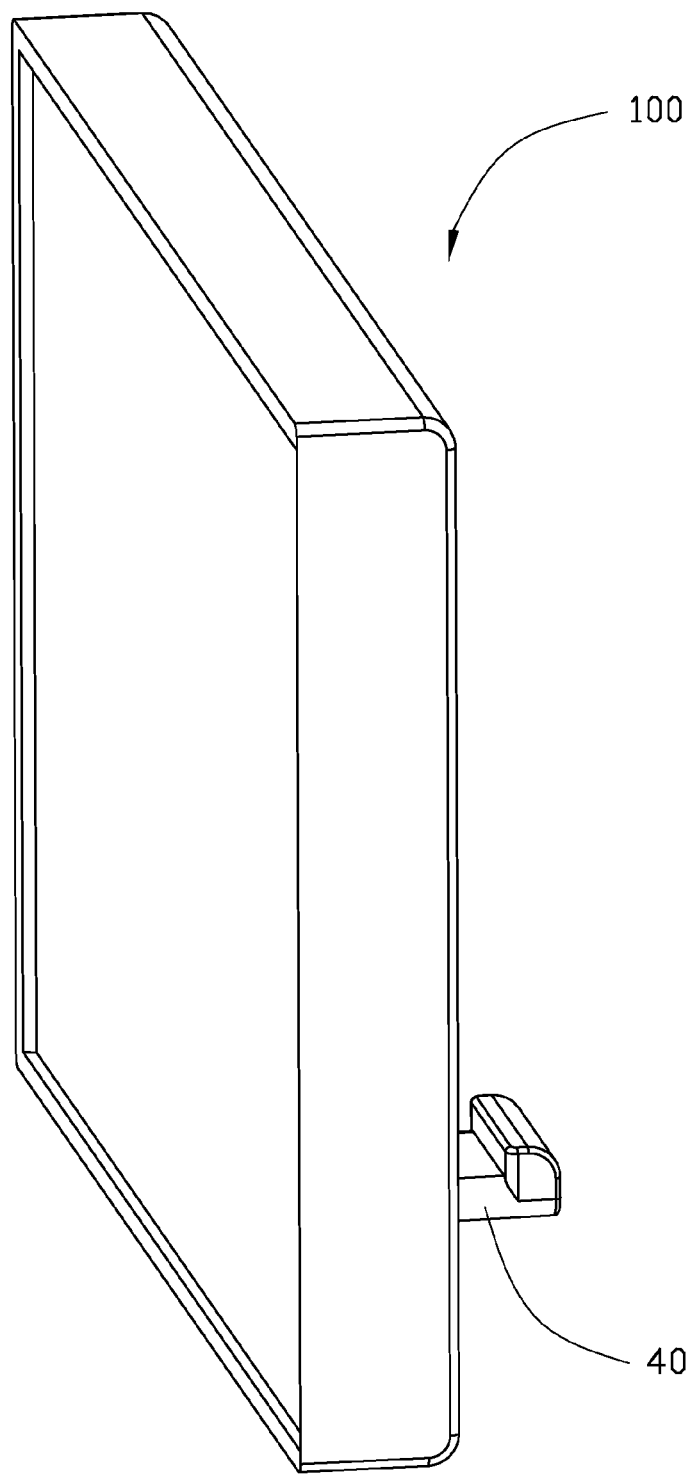
FIG. 1 is an isometric view of a device including a stand with an ejection mechanism in accordance with an exemplary embodiment.
Figure 2:
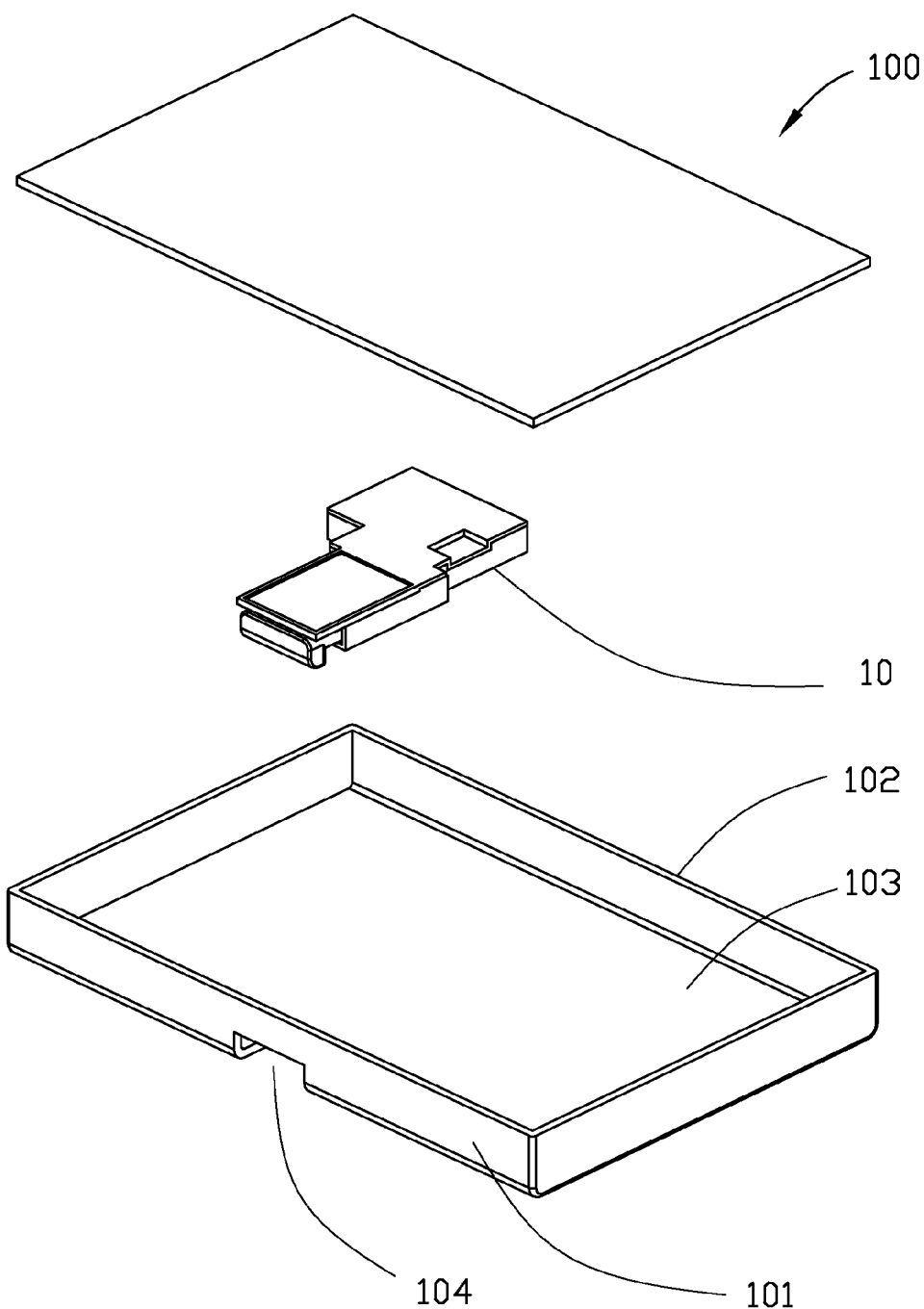
FIG. 2 is an exploded view of the device of FIG. 1.

Referring to FIGS. 1 and 2, a device 100 including a stand assembly 10 with an ejection mechanism is provided. In the embodiment, the device 100 is a digital photo frame. The device 100 includes a housing 101 that includes four sidewalls 102. The four sidewalls 102 are connected together, which defines a receiving space 103 to house the stand assembly 10. An opening 104 is formed in one of the sidewalls 102 and part of bottom surface of the housing 101, through which the stand assembly 10 can be ejected out.

Figure 3:
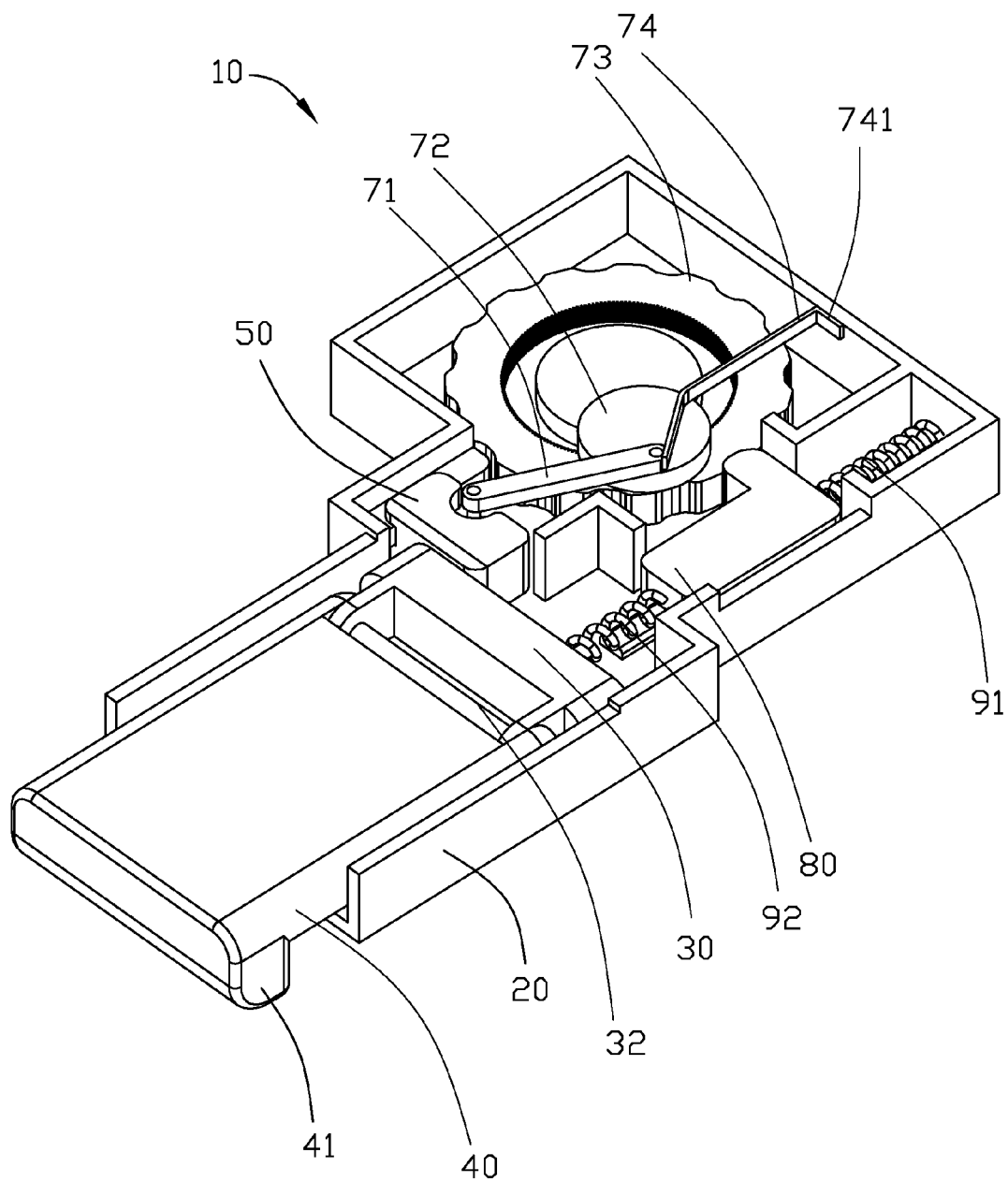
FIG. 3 is an isometric view of a stand assembly of the device of FIG. 1 with a cover omitted for clarity.
Figure 4:
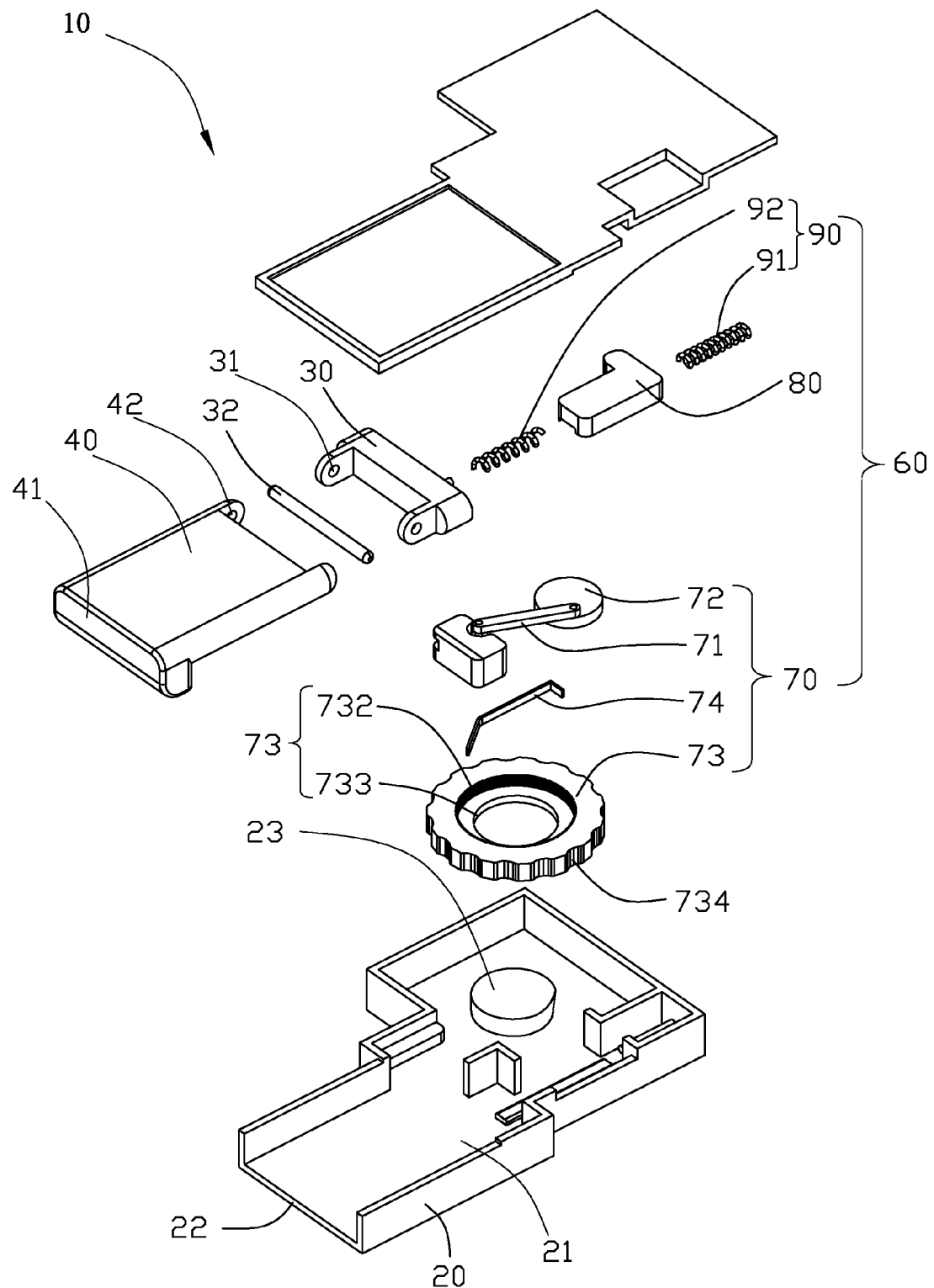
FIG. 4 is an exploded view of the stand assembly of FIG. 3.
Figure 5:
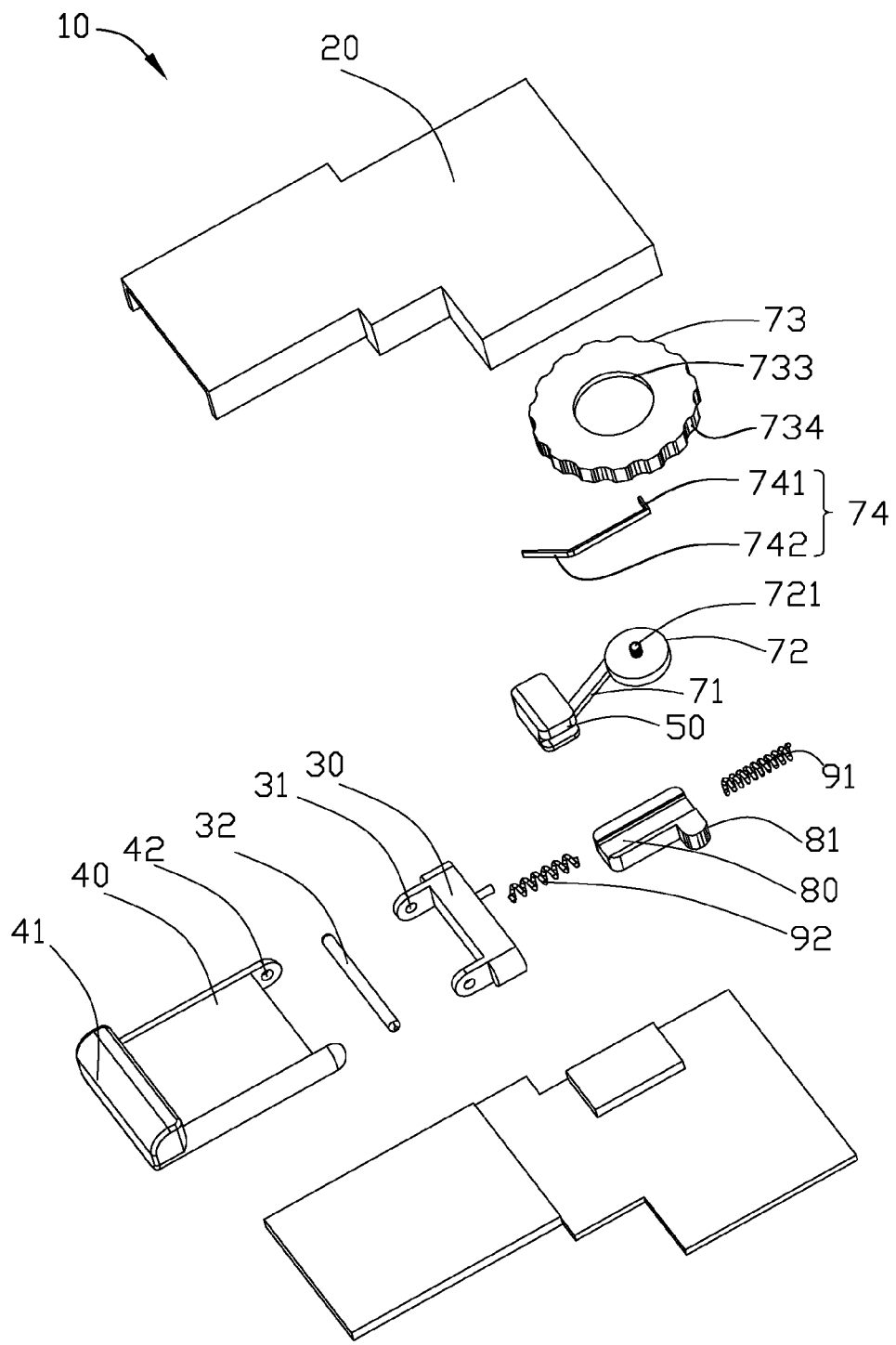
FIG. 5 is another exploded view of the stand assembly of FIG. 3 view from another perspective.
Figure 6:
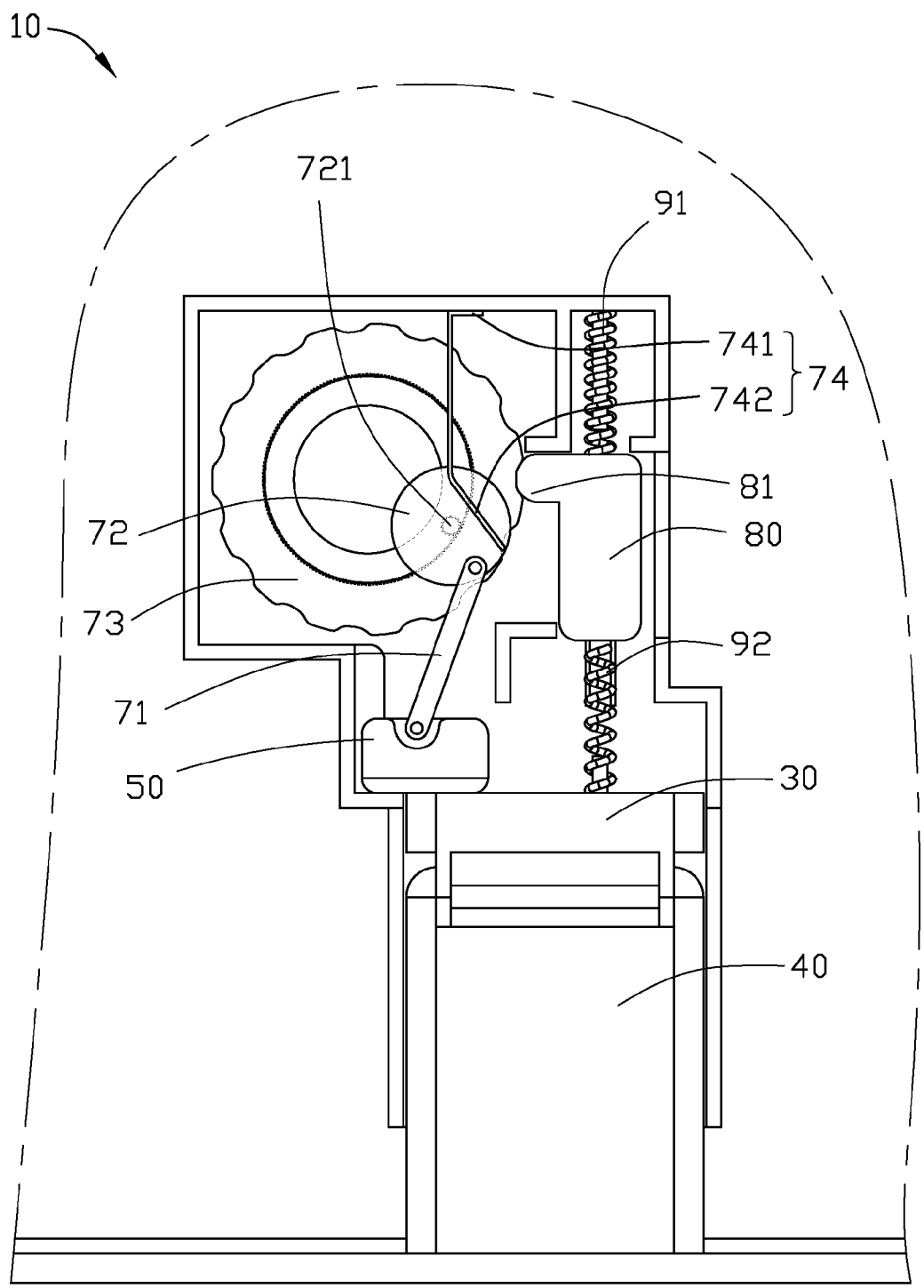
FIG. 6 is a planar front view of the stand assembly of FIG. 3, showing a stand of the stand assembly stays at a retracted state.
Figure 7:
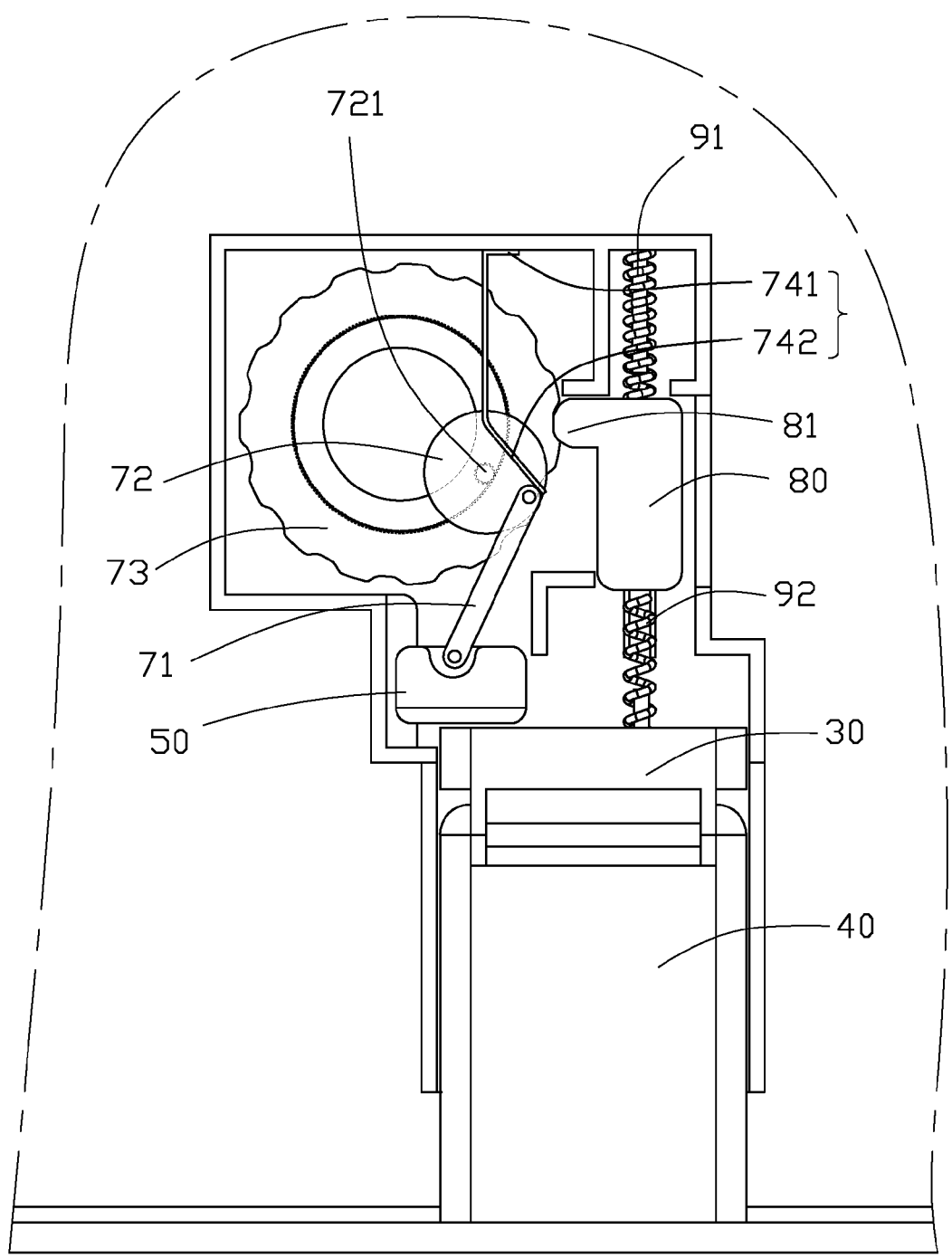
FIG. 7 is a planar front view of the stand assembly of FIG. 3, showing a linkage bar engages a spring member.
Figure 8:
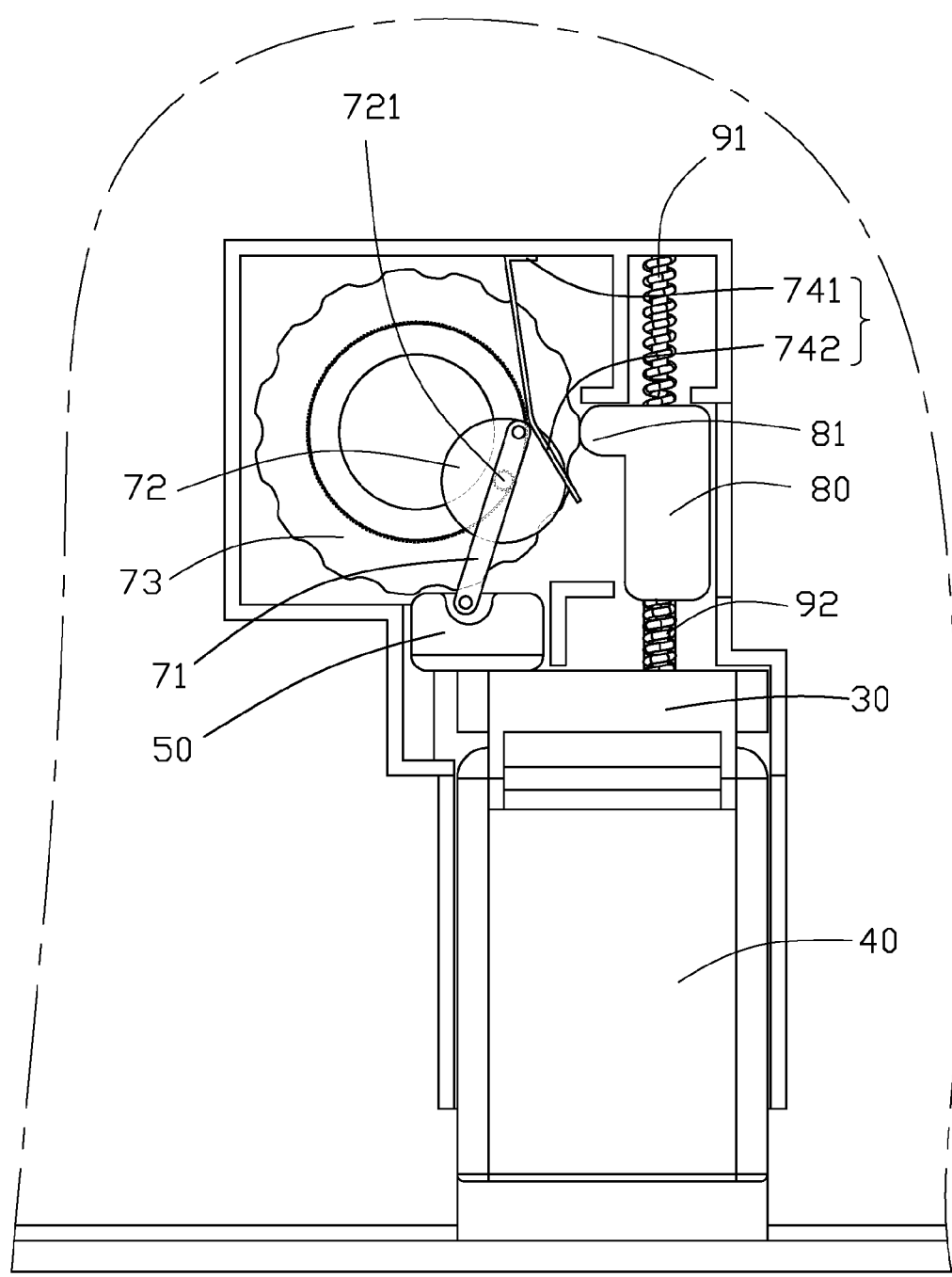
FIG. 8 is a planar front view of the stand assembly of FIG. 3, showing the linkage bar stay at a dead point position.
Figure 9:
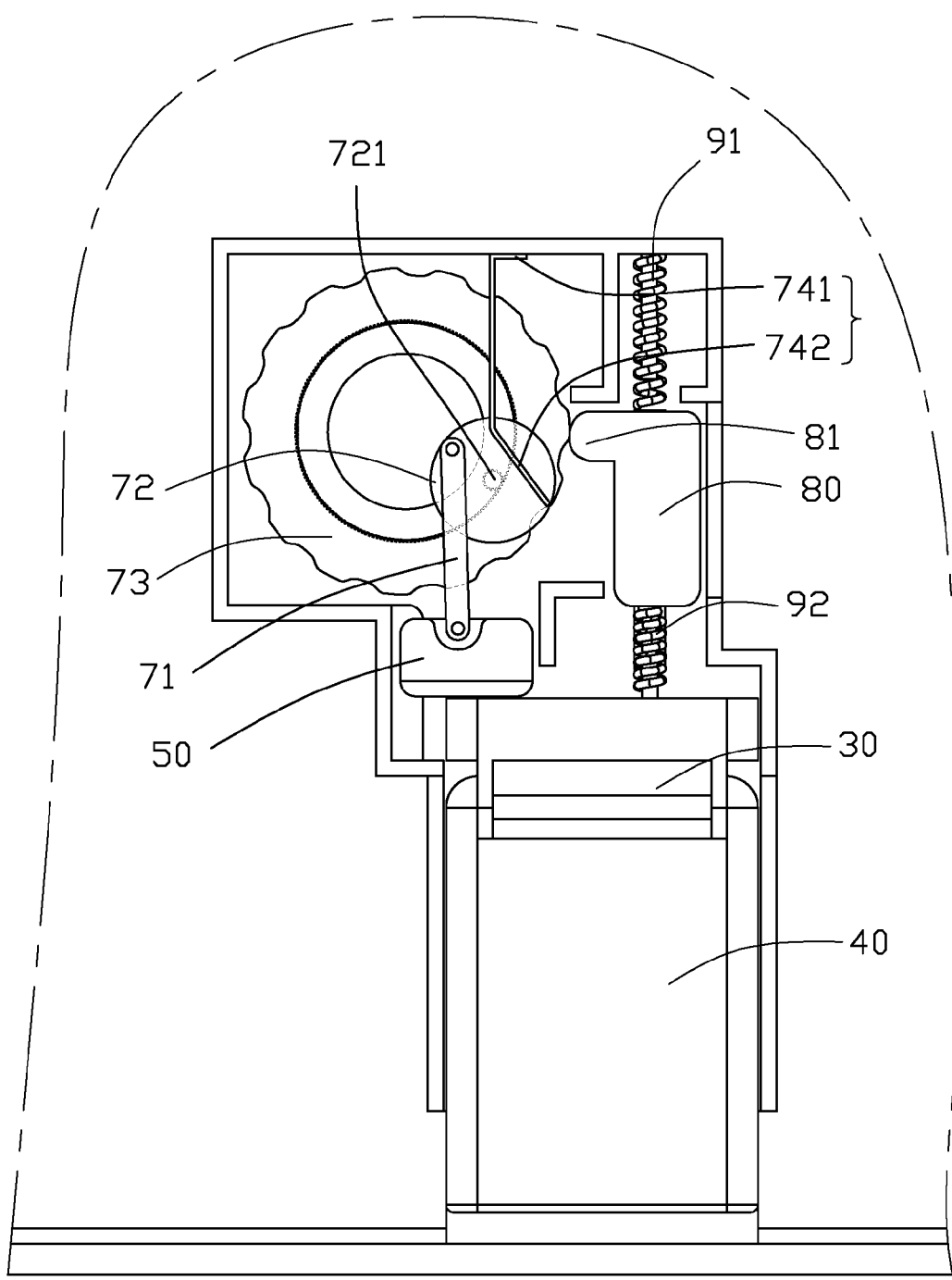
FIG. 9 is a planar front view of the stand assembly of FIG. 3, showing the linkage bar passes the dead point position.
Figure 10:
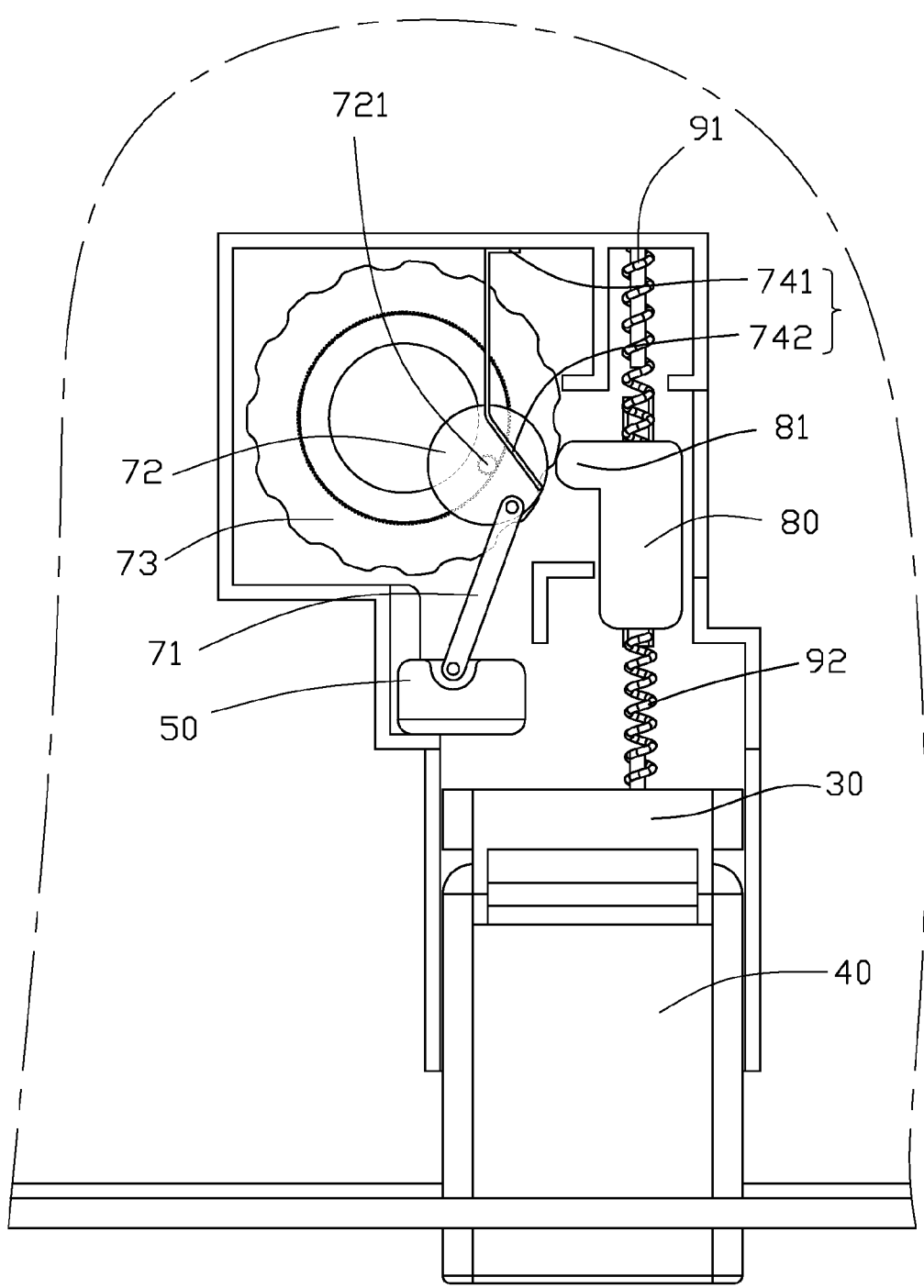
FIG. 10 is a planar front view of the stand assembly of FIG. 3, showing the stand is ejected out.

Referring to FIGS. 3-5, the stand assembly 10 includes a casing 20, a slider 30, a stand 40, a retainer 50, and an ejection mechanism 60. The casing 20 is fixed within the receiving space 103 of the housing 101 and includes a plurality of walls connected to each other, which together defines an open-ended accommodating space 21 to accommodate other components of the stand assembly 10. An open end 22 of the accommodating space 21 is opposite to the opening 104.

The slider 30 is slidably received in the space 21 of the casing 20. Two axle receivers 31 protrude from two ends of the slider 30 and are spaced from each other. An axle 32 is fixed to the axle receivers 31. The stand 40 includes two tabs 42 protruding from an end thereof. The two tabs 42 are spaced from each other and each defines an axle receiving hole to receive one end of the axle 32, such that the stand 40 can be pivotably connected to the slider 30.

The stand 40 is a flat plate and includes a distal end 41 opposite to the end connected to the slider 30. The distal end 41 is received in the opening 104 to receive a press from a user to eject the stand 40 out.

The retainer 50 is slidably connected to the casing 20. In the embodiment, the retainer 50 is a magnet and the slider 30 is made of magnetic material. The retainer 50 can thus magnetically attract the slider 30 to retain the slider 30 at a predetermined position, which causes the stand 40 to stay within the housing 101. In another embodiment, the retainer 50 and the slider 30 may be magnets having different polarities.

The ejection mechanism 60 is arranged within the accommodating space 21 of the casing 20 and is connected to the slider 30 and the retainer 50. The ejection mechanism 60 is adapted to be pushed by the retainer 50 to push the slider 30, such that the stand 40 can be ejected out. The user can then grasp the distal end 41 to drag the stand 40 out and turn the stand 40 until the stand 40 contacts an edge of the housing 101 (see FIG. 1). The stand 40 and the edge cooperate to constitute a support structure to support the device 100.

In the exemplary embodiment, the ejection mechanism 60 includes a transmission mechanism 70, a positioning member 80, and elastic members 90. The transmission mechanism 70 is connected to the retainer 50 and transmits motion from the retainer 50 to the positioning member 80, which causes the positioning member 80 to disengage from the transmission mechanism 70. The elastic members 90 can then be released to push the stand 40 to move.

In the embodiment, the transmission mechanism 70 includes a linkage bar 71, a drive wheel 72, a slave wheel 73, and a spring member 74. The linkage bar 71 includes two ends that are attached to the retainer 50 and the drive wheel 72, respectively. The drive wheel 72 includes a gear shaft 721 protruding from an end thereof. The joint between the linkage bar 71 and the drive wheel 72 is spaced from the rotating axis of the gear shaft 721.

The slave wheel 73 defines a stepped hole that includes a larger hole 732 and a smaller hole 733. The smaller hole 733 cooperates with a cylinder 23 protruding from an inner surface of the casing 20 to rotatably connect the slave wheel 73 to the casing 20. The larger hole 732 defines a plurality of gear teeth on an inner surface thereof, which engages the gear shaft 721. When the slider 30 is caused to move, the linkage bar 71 drives the drive wheel 72 to rotate about the rotating axis of the gear shaft 721 and move along the geared surface provided by the larger hole 732. As the drive wheel 72 moves, the slave wheel 73 is caused to rotate by the engagement between the gear shaft 721 and the gear teeth.

The elastic members 90 include a first spring 91 and a second spring 92. Two ends of the spring 91 are attached to an inner surface of the casing 20 and the positioning member 80. Two ends of the spring 92 are attached to the positioning member 80 and the slider 30. The positioning member 80 includes an angled end 81. The angled end 81 can be received in one of a plurality of recessed portions 734 formed in an outer lateral surface of the slave wheel 73. The positioning member 80 can then be positioned at a predetermined position, where the spring 91 is compressed.

Referring to FIGS. 6-10, when the distal end 41 of the stand 40 is pressed, the retainer 50 is caused to move inward, which further causes the slave wheel 73 to rotate. As the slave wheel 73 rotates, the positioning member 80 is pushed to move. After the slave wheel 73 has rotated for a predetermined angle, the angled end 81 of the positioning member 80 moves out from the recessed portion 734. The compressed spring 91 can then be released. Spring force from the spring 91 pushes the positioning member 80 to move outward. As the positioning member 80 moves, the spring 92 is compressed. When the spring force from the spring 92 overcomes the attractive force between the retainer 50 and the slider 30, the slider 30 is caused to move outward, which thus pushes the stand 40 to move outward. The distal end 41 of the stand 40 thus moves out of the opening 104. A user can then manipulate the stand 40 to support the device 100 as stated above.

In the embodiment, the spring member 74 includes an end 741 fixed to the casing 20. The spring member 74 is an elongated thin tab and also includes an angled portion 742. When the drive wheel 72 rotates from an initial position for a predetermined angle, the linkage bar 71 begins to contact the angled portion 742. Then, the spring member 74 deflects as the drive wheel 72 rotates and applies a spring push force to the linkage bar 71, which allows that the linkage bar 71 to pass a dead point (see FIG. 8). The term dead point means a position where a linkage mechanism is locked, which can be better understood by referring to page 220 of ROBOTIC SIMULATION by Daniel L. Ryan. The spring member 74 storing sufficient energy to push the linkage bar 71 to pass the dead point position, which permits the linkage bar 71 to continue to push the drive wheel 72 to rotate.

When needed to be retracted, the stand 40 is turned and pushed into the housing 101 through the opening 104. The stand 40 causes the slider 30 to move inward. After the slider 30 passes a predetermined position, the retainer 50 attracts the slider 30 until the slider 30 engages the retainer 50. The positioning member 80 is pushed by the spring 92 to move inward until the angled end 81 is received in one of the recessed portions 734. The stand 40 is thus retained within the housing 101.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A device comprising:
   a housing defining a first opening;
   a casing fixed within the housing defining a second opening opposite to the first opening;
   a sliding member slidably received in the casing;
   a stand pivotally connected to the sliding member and having an end received in the first opening;
   a retaining member slidably connected to the casing to magnetically attract the sliding member to retain the sliding member at a predetermined position; and
   an ejection mechanism arranged within the casing to be pushed by the retaining member to push the sliding member to move the end out of the first opening.

2. The device according to claim 1, wherein the retaining member is a magnet and the sliding member is made of magnetic material.

3. The device according to claim 1, wherein the retaining member and the sliding member are magnets and have different polarities.

4. The device according to claim 1, wherein the ejection mechanism comprises a transmission mechanism, a positioning member, and an elastic member, the transmission mechanism transmits motion from the retaining member to the positioning member and causes the positioning member to move, which allows the elastic member to be released to push the sliding member.

5. The device according to claim 4, wherein the transmission mechanism comprises a linkage bar, a drive wheel, and a slave wheel rotatably connected to the casing, the linkage bar comprises two ends attached to the retaining member and the drive wheel, respectively, to push the drive wheel to move with respect to the slave wheel, which engages the slave wheel and causes the slave wheel to rotate, the slave wheel rotates to causes the positioning member to move.

6. The device according to claim 5, wherein the drive wheel comprises a first gear means, the slave wheel comprises a second gear means, the first gear means engages the second gear means, which transmits rotating motion from the drive wheel to the slave wheel.

7. The device according to claim 5, wherein the slave wheel includes a lateral surface defines a plurality of recessed portions, the positioning member is slidably connected to the casing and comprises a base and a protruding portion protruding form the base along a direction perpendicular to a sliding direction of the positioning member, the protruding portion is received in one of the recessed portions to hold the positioning member in position and disengages from the one of the recessed portions when the slave wheel rotates, which allows the elastic member to be released to push the sliding member.

8. The device according to claim 5, wherein the elastic member includes a first spring and a second spring, the first spring comprises two ends attached to the casing and the positioning member, the second spring comprises two ends attached to the positioning member and the sliding member.

9. The device according to claim 6, wherein the first gear means is a gear shaft, the second gear means comprises a plurality of internal gear teeth.

10. The device according to claim 5, further comprising a spring member attached to the casing to apply a spring push force to assist the linkage bar to pass a dead point.

11. The device according to claim 10, where the spring member is a tab that includes an angled portion adjacent to an end of the linkage bar.

* * * * *